United States Patent
DiFalco et al.

(10) Patent No.: US 10,318,894 B2
(45) Date of Patent: Jun. 11, 2019

(54) CONFORMANCE AUTHORITY RECONCILIATION

(75) Inventors: Robert A. DiFalco, Portland, OR (US); Kenneth L. Keeler, Lake Oswego, OR (US); Robert L. Warmack, West Linn, OR (US)

(73) Assignee: Tripwire, Inc., Portland, OR (US)

(*) Notice: Subject to any disclaimer, the term of this patent is extended or adjusted under 35 U.S.C. 154(b) by 669 days.

(21) Appl. No.: 11/205,586

(22) Filed: Aug. 16, 2005

(65) Prior Publication Data

US 2007/0043786 A1   Feb. 22, 2007

(51) Int. Cl.
  *G06F 16/11*   (2019.01)
  *H04L 12/24*   (2006.01)
  *G06Q 10/06*   (2012.01)

(52) U.S. Cl.
  CPC ........... *G06Q 10/06* (2013.01); *G06F 16/128* (2019.01); *H04L 41/0866* (2013.01)

(58) Field of Classification Search
  CPC ............ G06F 17/30306; G06F 16/128; G06F 16/215; G06F 16/217; H04L 41/0866; H04L 41/0893; H04L 41/0813; H04L 41/0873; H04L 41/0869; G06Q 10/06
  USPC ................ 707/691, 616, 634, 649, 638, 639
  See application file for complete search history.

(56) References Cited

U.S. PATENT DOCUMENTS

| | | |
|---|---|---|
| 5,063,523 A | 11/1991 | Vrenjak |
| 5,542,047 A | 7/1996 | Armstrong |
| 5,655,081 A | 8/1997 | Bonnell et al. |
| 5,745,669 A | 4/1998 | Hugard et al. |
| 5,764,913 A | 6/1998 | Jancke et al. |
| 5,778,184 A | 7/1998 | Brownmiller et al. |
| 5,845,062 A | 12/1998 | Branton et al. |
| 5,878,408 A | 3/1999 | Van Huben et al. |
| 5,913,036 A | 6/1999 | Brownmiller et al. |
| 5,913,037 A | 6/1999 | Spofford et al. |
| 5,933,838 A | 8/1999 | Lomet |
| 5,963,959 A * | 10/1999 | Sun et al. |
| 6,041,347 A * | 3/2000 | Harsham et al. ............ 709/220 |
| 6,052,722 A | 4/2000 | Taghadoss |
| 6,064,656 A | 5/2000 | Angal et al. |
| 6,070,244 A | 5/2000 | Orchier et al. |
| 6,072,777 A | 6/2000 | Bencheck et al. |
| 6,122,639 A | 9/2000 | Babu et al. |
| 6,122,664 A | 9/2000 | Boukobza et al. |

(Continued)

OTHER PUBLICATIONS

Parnas. "On the criteria to be used in decomposing systems into modules" Dec. 1972. Communications of the ACM. vol. 15 Issue 12. pp. 1053-1058.*

(Continued)

*Primary Examiner* — James E Richardson
(74) *Attorney, Agent, or Firm* — Klarquist Sparkman, LLP (57) ABSTRACT

An automated method for facilitating management of a data processing environment is disclosed. In various embodiments, the method may include facilitating detecting of a change to an element of a data processing device of the data processing environment. In various embodiments, the method may further include facilitating reconciling the change with a conformance authority, the conformance authority having one or more guidelines. Other embodiments of the present invention may include, but are not limited to, apparatuses adapted to facilitate practice of the above-described method.

27 Claims, 4 Drawing Sheets

(56) References Cited

U.S. PATENT DOCUMENTS

| | | | |
|---|---|---|---|
| 6,125,390 A | 9/2000 | Touboul | |
| 6,144,993 A | 11/2000 | Fukunaga et al. | |
| 6,195,689 B1 | 2/2001 | Bahlmann | |
| 6,222,827 B1 | 4/2001 | Grant et al. | |
| 6,253,339 B1 | 6/2001 | Tse et al. | |
| 6,272,537 B1 | 8/2001 | Kekic et al. | |
| 6,341,287 B1* | 1/2002 | Sziklai et al. | 707/102 |
| 6,356,885 B2 | 3/2002 | Ross et al. | |
| 6,393,386 B1 | 5/2002 | Zager et al. | |
| 6,393,474 B1 | 5/2002 | Eichert et al. | |
| 6,490,690 B1* | 12/2002 | Gusler | G06F 11/1415 714/15 |
| 6,493,755 B1 | 12/2002 | Hansen et al. | |
| 6,535,512 B1 | 3/2003 | Daniel et al. | |
| 6,647,400 B1 | 11/2003 | Moran | |
| 6,658,568 B1 | 12/2003 | Ginter et al. | |
| 6,664,978 B1 | 12/2003 | Kekic et al. | |
| 6,701,345 B1 | 3/2004 | Carley et al. | |
| 6,742,114 B1 | 5/2004 | Carter et al. | |
| 6,751,661 B1 | 6/2004 | Geddes | |
| 6,853,987 B1 | 2/2005 | Cook | |
| 6,886,047 B2 | 4/2005 | Leong et al. | |
| 6,895,414 B2* | 5/2005 | Ford et al. | 707/203 |
| 6,957,227 B2 | 10/2005 | Fogel et al. | |
| 6,983,317 B1 | 1/2006 | Bishop et al. | |
| 7,016,888 B2 | 3/2006 | Slemmer et al. | |
| 7,035,877 B2 | 4/2006 | Markham et al. | |
| 7,039,698 B2 | 5/2006 | Slemmer et al. | |
| 7,051,050 B2 | 5/2006 | Chen et al. | |
| 7,058,861 B1 | 6/2006 | Adams | |
| 7,065,767 B2 | 6/2006 | Kambhammettu et al. | |
| 7,080,037 B2 | 7/2006 | Burger et al. | |
| 7,082,554 B2 | 7/2006 | Wilson et al. | |
| 7,131,037 B1 | 10/2006 | LeFaive et al. | |
| 7,158,985 B1 | 1/2007 | Liskov | |
| 7,159,036 B2 | 1/2007 | Hinchliffe et al. | |
| 7,228,460 B2 | 6/2007 | Pomaranski et al. | |
| 7,243,348 B2 | 7/2007 | Good et al. | |
| 7,290,164 B1* | 10/2007 | Harvey et al. | 714/2 |
| 7,316,016 B2 | 1/2008 | DiFalco | |
| 7,317,693 B1 | 1/2008 | Roesch et al. | |
| 7,360,099 B2 | 4/2008 | DiFalco et al. | |
| 7,474,425 B2 | 1/2009 | Sasama | |
| 7,529,197 B2 | 5/2009 | Shell et al. | |
| 7,587,754 B2 | 9/2009 | DiFalco et al. | |
| 7,590,669 B2 | 9/2009 | Yip et al. | |
| 7,600,007 B1 | 10/2009 | Lewis | |
| 7,603,440 B1 | 10/2009 | Grabowski et al. | |
| 7,620,715 B2 | 11/2009 | DiFalco et al. | |
| 7,636,736 B1 | 12/2009 | Kumar et al. | |
| 7,765,460 B2 | 7/2010 | DiFalco et al. | |
| 7,774,791 B1 | 8/2010 | Applebaum et al. | |
| 7,822,724 B2 | 10/2010 | DiFalco et al. | |
| 8,090,677 B2 | 1/2012 | Murphy et al. | |
| 8,140,635 B2 | 3/2012 | DiFalco | |
| 8,176,158 B2 | 5/2012 | DiFalco et al. | |
| 8,443,445 B1 | 5/2013 | Andruss et al. | |
| 8,914,341 B2 | 12/2014 | DiFalco | |
| 9,209,996 B2 | 12/2015 | DiFalco | |
| 9,256,841 B2 | 2/2016 | DiFalco | |
| 2001/0044840 A1* | 11/2001 | Carleton | 709/223 |
| 2001/0052010 A1 | 12/2001 | Kim | |
| 2002/0026339 A1 | 2/2002 | Frankland et al. | |
| 2002/0035561 A1 | 3/2002 | Archer et al. | |
| 2002/0069274 A1 | 6/2002 | Tindal et al. | |
| 2002/0116363 A1 | 8/2002 | Grainger | |
| 2002/0156799 A1* | 10/2002 | Markel | G06F 17/3089 |
| 2002/0176378 A1 | 11/2002 | Hamilton et al. | |
| 2002/0188711 A1 | 12/2002 | Meyer et al. | |
| 2003/0005109 A1* | 1/2003 | Kambhammettu et al. | 709/224 |
| 2003/0008662 A1 | 1/2003 | Stern et al. | |
| 2003/0101341 A1 | 5/2003 | Kettler et al. | |
| 2003/0110280 A1 | 6/2003 | Hinchliffe et al. | |
| 2003/0149756 A1 | 8/2003 | Grieve et al. | |
| 2003/0172151 A1 | 9/2003 | Schade | |
| 2003/0197743 A1 | 10/2003 | Hill et al. | |
| 2003/0202201 A1 | 10/2003 | Muto et al. | |
| 2003/0204517 A1 | 10/2003 | Skinner et al. | |
| 2003/0217134 A1 | 11/2003 | Fontoura et al. | |
| 2003/0233431 A1* | 12/2003 | Reddy et al. | 709/221 |
| 2004/0006614 A1 | 1/2004 | DiFalco | |
| 2004/0024843 A1 | 2/2004 | Smith | |
| 2004/0059770 A1 | 3/2004 | Bossen | |
| 2004/0059930 A1 | 3/2004 | DiFalco et al. | |
| 2004/0060046 A1 | 3/2004 | Good et al. | |
| 2004/0068562 A1 | 4/2004 | Tilton et al. | |
| 2004/0122962 A1 | 6/2004 | DiFalco et al. | |
| 2004/0123133 A1 | 6/2004 | DiFalco et al. | |
| 2004/0153875 A1 | 8/2004 | Amyot et al. | |
| 2004/0186903 A1 | 9/2004 | Lambertz | |
| 2004/0205182 A1 | 10/2004 | Geddes | |
| 2004/0243600 A1* | 12/2004 | Ikeda et al. | 707/100 |
| 2004/0252693 A1* | 12/2004 | Cheriton et al. | 370/395.1 |
| 2004/0254927 A1* | 12/2004 | Lang et al. | 707/5 |
| 2004/0260803 A1 | 12/2004 | Nakamura | |
| 2005/0005169 A1 | 1/2005 | Kelekar | |
| 2005/0015622 A1* | 1/2005 | Williams et al. | 713/201 |
| 2005/0043961 A1 | 2/2005 | Tones et al. | |
| 2005/0071642 A1 | 3/2005 | Moghe et al. | |
| 2005/0096949 A1 | 5/2005 | Aiber et al. | |
| 2005/0097199 A1 | 5/2005 | Woodard et al. | |
| 2005/0120101 A1 | 6/2005 | Nocera | |
| 2005/0149578 A1 | 7/2005 | Sustman et al. | |
| 2005/0165790 A1 | 7/2005 | Seliger et al. | |
| 2005/0165954 A1 | 7/2005 | Burdick et al. | |
| 2005/0177600 A1 | 8/2005 | Eilam et al. | |
| 2005/0207553 A1 | 9/2005 | Fleck et al. | |
| 2005/0256787 A1 | 11/2005 | Wadawadigi et al. | |
| 2005/0278191 A1 | 12/2005 | DiFalco et al. | |
| 2005/0278453 A1* | 12/2005 | Cherkasova | H04L 29/06027 709/231 |
| 2006/0025985 A1 | 2/2006 | Vinberg et al. | |
| 2006/0031529 A1 | 2/2006 | Keith, Jr. | |
| 2006/0036560 A1 | 2/2006 | Fogel | |
| 2006/0080656 A1 | 4/2006 | Cain et al. | |
| 2006/0085403 A1 | 4/2006 | Harrison et al. | |
| 2006/0085543 A1* | 4/2006 | Hrastar | H04L 63/1408 709/224 |
| 2006/0101520 A1* | 5/2006 | Schumaker | G06F 21/554 726/25 |
| 2006/0143685 A1 | 6/2006 | Vasishth et al. | |
| 2006/0149704 A1* | 7/2006 | Wyatt et al. | 707/2 |
| 2006/0195905 A1 | 8/2006 | Fudge | |
| 2006/0212477 A1 | 9/2006 | Murphy et al. | |
| 2006/0212487 A1 | 9/2006 | Kennis et al. | |
| 2006/0224663 A1 | 10/2006 | Shahbazi | |
| 2006/0242277 A1 | 10/2006 | Torrence et al. | |
| 2006/0248084 A1 | 11/2006 | Sack et al. | |
| 2006/0277080 A1 | 12/2006 | DeMartine et al. | |
| 2007/0005320 A1 | 1/2007 | Vinberg et al. | |
| 2007/0005740 A1 | 1/2007 | DiFalco et al. | |
| 2007/0022365 A1 | 1/2007 | DiFalco et al. | |
| 2007/0028303 A1* | 2/2007 | Brennan | G06F 21/55 726/24 |
| 2007/0043674 A1 | 2/2007 | DiFalco et al. | |
| 2007/0124255 A1 | 5/2007 | DiFalco et al. | |
| 2007/0180490 A1 | 8/2007 | Renzi et al. | |
| 2007/0214193 A1 | 9/2007 | Takahashi et al. | |
| 2008/0082374 A1 | 4/2008 | Kennis et al. | |
| 2008/0104217 A1 | 5/2008 | Srinivasa et al. | |
| 2008/0126377 A1 | 5/2008 | Bush et al. | |
| 2008/0229262 A1 | 9/2008 | Harashima et al. | |
| 2009/0171732 A1 | 7/2009 | Bobak et al. | |
| 2009/0183236 A1 | 7/2009 | Ben-Ezra et al. | |
| 2009/0204701 A1 | 8/2009 | Herzog et al. | |
| 2010/0005107 A1 | 1/2010 | DiFalco | |
| 2011/0137905 A1 | 6/2011 | Good et al. | |
| 2011/0138038 A1 | 6/2011 | Good et al. | |
| 2011/0138039 A1 | 6/2011 | Good et al. | |
| 2011/0197094 A1 | 8/2011 | Wagner | |
| 2011/0197189 A1 | 8/2011 | Wagner et al. | |

(56) References Cited

U.S. PATENT DOCUMENTS

2011/0197205 A1     8/2011    Wagner et al.
2012/0023076 A1     1/2012    Torrence et al.

OTHER PUBLICATIONS

IEEE 100: the authoritative dictionary of IEEE standards terms. 7th edition. 2000. pp. 407.*

Payment Card Industry Data Security Standard, Visa, Version 1.0, Dec. 15, 2004 (Year: 2004).*

RFC1157 Simple Network Management Protocol (SNMP), Case et al. May 1990. (Year: 1990).*

Derbort et al., "Conversion of a Rule Based to an Object Oriented Expert System," *IEEE*, pp. 751-754 (1991).

Kerschberg et al., "Intelligent Network Management: A Heterogeneous Knowledge Source Approach," *IEEE*, pp. 314-316 (1990).

Kim et al., "The Design and Implementation of Tripwire: A File System Integrity Checker," (1993) *Computer Science Technical Reports*, 23 pages.

Kim et al., "Experiences with Tripwire: Using Integrity checkers for Intrusion Detection," (1994) *Computer Science Technical Reports*, 15 pages.

* cited by examiner

CONFORMANCE AUTHORITY RECONCILIATION

FIELD

Disclosed embodiments of the present invention relate generally to the field of data processing, and more particularly to conformance authority reconciliation in data processing environments.

BACKGROUND

Data processing devices are deployed in many different configurations and are used for many different applications in a variety of data processing environments. Management of a data processing environment may be performed in a number of nonexclusive ways. Changes may occur to data processing devices of a data processing environment. Compliance with various regulatory and/or other guidelines may be impacted by these changes.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION OF ILLUSTRATIVE EMBODIMENTS

Embodiments of the present invention include, but are not limited to, an automated method for facilitating management of a data processing environment. In various embodiments, the method may include facilitating detecting of a change to an element of a data processing device of the data processing environment. In various embodiments, the method may further include facilitating reconciling the change with a conformance authority, the conformance authority having one or more guidelines. Other embodiments of the present invention may include, but are not limited to, apparatuses adapted to facilitate practice of the above-described method. While portions of the following discussion may be primarily presented in the context of specific types of data processing devices, it is understood that the principles described herein apply to a broad range of data processing devices.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Parts of the descriptions of various embodiments will be presented in terms of operations performed by a processor-based device, using terms such as data and the like, consistent with the manner commonly employed by those skilled in the art to convey the substance of their work to others skilled in the art. As well understood by those skilled in the art, the quantities may take the form of electrical, magnetic, or optical signals capable of being stored, transferred, combined, and otherwise manipulated through mechanical and electrical components of the processor-based device; and the term processor includes microprocessors, micro-controllers, digital signal processors, and the like, that are standalone, adjunct or embedded.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in some embodiments" is used repeatedly. The phrase does not generally refer to the same group of embodiments, however, it may. The phrase "in various embodiments" is used repeatedly. The phrase does not generally refer to the same group of embodiments, however, it may. The terms "comprising," "having" and "including" are synonymous, unless the context dictates otherwise.

Some embodiments of the present invention include a scalable architecture to facilitate conformance authority reconciliation in data processing environments containing data processing devices. Such data processing devices may include, but are not limited to, networking devices, servers, desktop computers, laptop computers, tablet computers, personal digital assistants, cellular phones, set top boxes, media players, or other types of data processing devices. In some embodiments, a data processing environment may comprise a continuously or intermittently connected environment of data processing devices, including data processing devices communicating through the Internet. In some embodiments, a data processing environment may comprise a directly or indirectly connected environment of data processing devices, including data processing devices communicating through the Internet. In various embodiments, one or more modules may facilitate the operations described herein.

Figure 1:
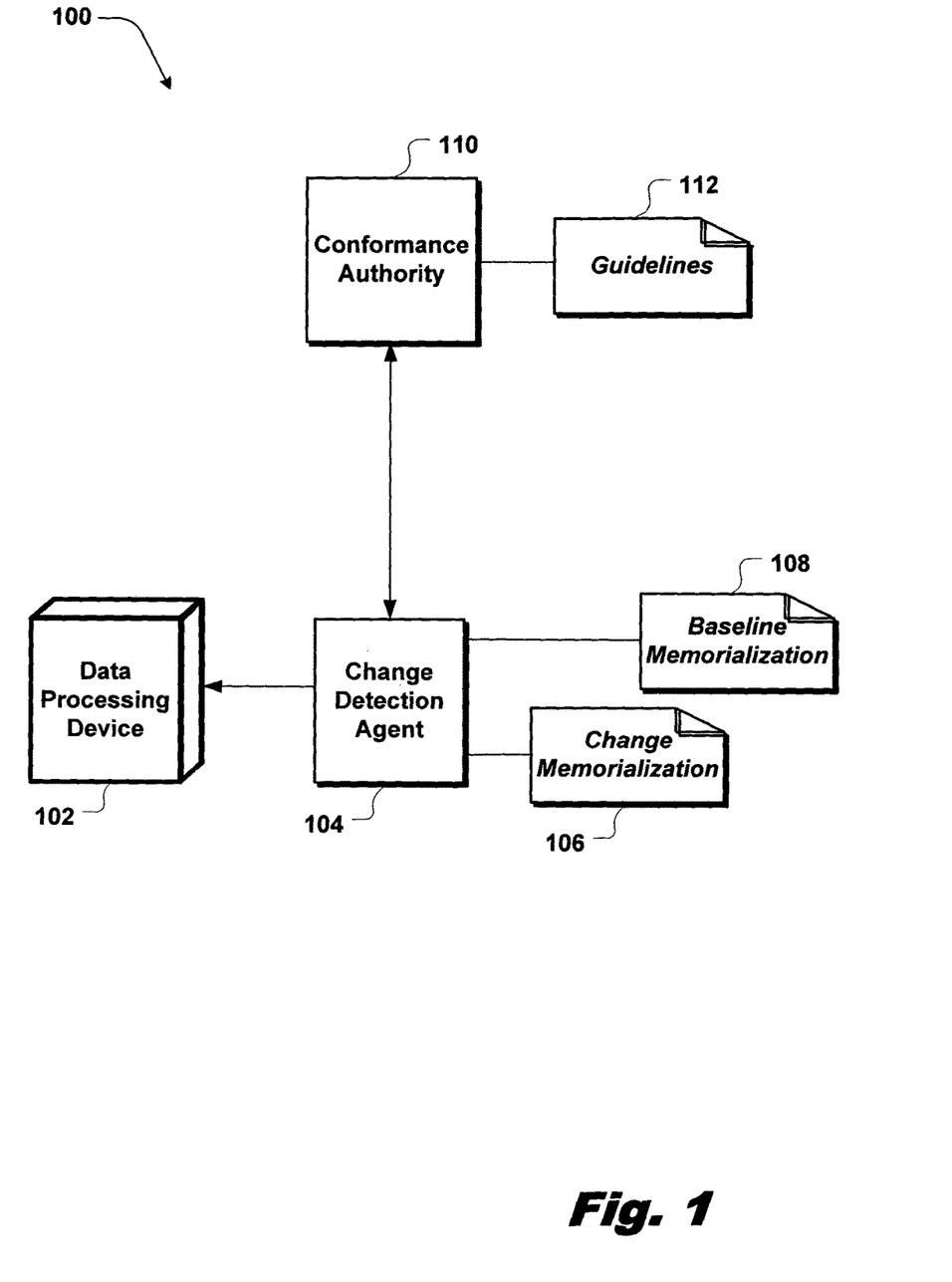
FIG. 1 illustrates some aspects of a data processing environment, in accordance with various embodiments of this invention.

FIG. 1 illustrates some aspects of data processing environment 100, in accordance with various embodiments of this invention. Data processing environment 100 may include data processing device 102. Data processing environment 100 may include other data processing devices of one or more types. In various embodiments, data processing device 102 may comprise a computer, such as a server or a desktop computer. In various embodiments, data processing device 102 may comprise another type of data processing device, such as, a networking device (a router, a switch, a gateway, or the like), a laptop computer, a tablet computer, a personal data assistant, a cellular phone, a set top box, a media player, or the like.

Illustrating a portion of a possible operational context in some embodiments, change detection agent 104 may facilitate detecting of a change to an element (not shown) of data processing device 102 of data processing environment 100. In various embodiments, an element may comprise, for example, a file of data processing device 102. In various embodiments, an element may comprise another component of data processing device 102. In various embodiments, change detection agent 104 may detected a change in an element and may memorialize the change detected in change memorialization 106. In various embodiments, change memorialization 106 may comprise a memorialization of one or more changes detected on one or more elements of data processing device 102.

In various embodiments, change memorialization 106 may comprise a file. In various embodiments, change memorialization 106 may comprise a different type of memorialization of a change detected. In various embodiments, change detection agent 104 may facilitate detecting a change by facilitating taking a snapshot of a current state (not shown) of an element of data processing device 102, and may further compare the snapshot to a previously taken snapshot (not shown) of the element. In various embodiments, change detection agent 104 may facilitate taking a snapshot of a current state of an element of data processing device 102 in the course of facilitating taking a snapshot of a set of elements of data processing device 102.

In some embodiments, the previously taken snapshot may include a baseline state of the element, with FIG. 1 illustrating some such embodiments with baseline memorialization 108 including a baseline state of the element. In various embodiments, a baseline of an element may include a known, good state of the element. In various other embodiments, a baseline of an element may include another state of the element. In some embodiments, the previously taken snapshot may represent a state other than a current baseline state. In some embodiments, change detection agent 104 may facilitate obtaining the previously taken snapshot of the element. In some embodiments, the previously taken snapshot of the element may be obtained in another manner.

Illustrating a portion of a possible operational context in various embodiments, change detection agent 104 may facilitate reconciling the change with conformance authority 110. In various embodiments, conformance authority 110 may comprise a policy-based management tool. In various embodiments, conformance authority 110 may comprise a configuration management tool. In various embodiments, conformance authority 110 may comprise another type of conformance authority. Conformance authority 110 may contain one or more guidelines, illustrated as guidelines 112, pertaining to one or more data processing devices. In various embodiments, the one or more guidelines may be segmented and used by conformance authority 110 in any number of ways, including, but not limited to, having subsets of guidelines for specific data processing devices, having subsets of guidelines for certain types of data processing devices, having subsets of guidelines for designated groups of data processing devices, and the like. In various embodiments, conformance authority 110 may contain one or more such subsets of guidelines within its guidelines 112.

In various embodiments, change detection agent 104 may facilitate reconciling the change by determining whether at least one of the guidelines of conformance authority 110 relates to at least a subset of the element where the change was detected. For example, change detection agent 104 may detect a change to an element of data processing device 102, but guidelines 112 of conformance authority 110 may not encompass the element at issue, or guidelines 112 may encompass the element at issue, but may not encompass the subset of the element where the change was detected. In various embodiments, change detection agent 104 may facilitate reconciling the change in another manner.

In various embodiments, change detection agent 104 may facilitate reconciling the change by determining whether the detected change violates at least one guideline of guidelines 112. An exemplar is provided in FIG. 2, providing more detail on some operations involved in such a process, in accordance with various embodiments. In various embodiments, change detection agent 104 may facilitate reconciling the change in another manner.

In various embodiments of data processing environment 100, the facilitating detecting of a change and the facilitating reconciling the change may be first performed at a first point in time, with further operations repeating the facilitating detecting and the facilitating reconciling at least once, at a second later point in time. In some such embodiments, further operations may comprise scheduling the repeating of the facilitating detecting and the facilitating reconciling at the second later point in time.

In various embodiments, a further operation of reporting the change supplemented with a performance parameter of data processing device 102 may be provided. Such a performance parameter may include, but not be limited to, transactions per time period processed. In various embodiments, a further operation may be provided of reporting the change among a plurality of detected changes, the reporting supplemented with one or more performance parameters of a plurality of data processing devices of a data processing environment. Such a performance parameter may include, but not be limited to, network outages. Such reporting may be used as a basis for an operational analysis of a data processing device and/or a data processing environment, and may provide a basis for changing the guidelines used.

Figure 2:
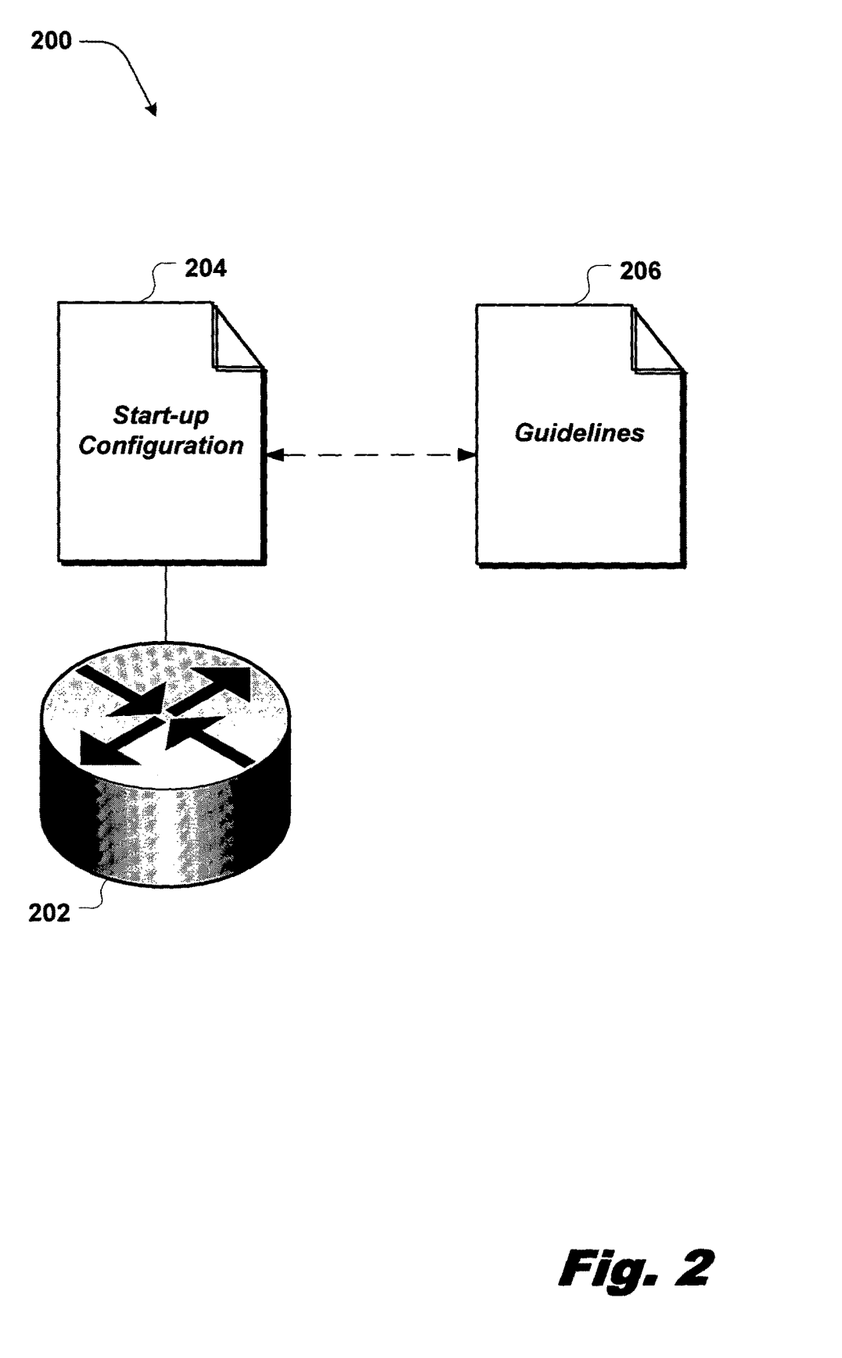
FIG. 2 illustrates some aspects of an application of guidelines in the context of a data processing device, in accordance with various embodiments of this invention.

FIG. 2 illustrates some aspects of an application 200 of guidelines in the context of a data processing device, in accordance with various embodiments of this invention. Router 202 may have one or more elements associated with it, including but not limited to, start-up configuration 204. In various embodiments, an element of a data processing device may reside on the data processing device. In various other embodiments, an element of a data processing device may reside elsewhere in the data processing environment. In various embodiments, an element may be of one data processing device, while in various other embodiments, an element may be of multiple data processing devices.

While router 202 is illustrated as an example data processing device in FIG. 2, various embodiments of the invention may apply to a wide range of data processing devices, such as, but not limited to, other networking devices, servers, desktop computers, laptop computers, tablet computers, personal digital assistants, cellular phones, set top boxes, media players, and the like. In various embodiments, facilitating detecting of a change and facilitating reconciling the change with a conformance authority may occur within a data processing environment containing a heterogeneous mixture of data processing devices. In various other embodiments, such facilitating detecting and reconciling may occur within other kinds of data processing environments. While certain operations will be described in discussing FIG. 2, other operations may supplement or supplant the operations shown, in the context of various embodiments.

Start-up configuration 204 may have content classifiable as subsets of start-up configuration 204, such as, but not limited to, parameters. One such parameter may be a time to live (TTL) parameter. A change may occur to the TTL parameter in start-up configuration 204, such as, for example, by a network administrator making the change. A change detection agent may detect such a change, as illustrated in FIG. 1. The change detection agent (not shown in FIG. 2) may then facilitate reconciling the change with guidelines 206 of a conformance authority (not shown). In the example of guidelines 206 encompassing a TTL parameter, conformance of the changed TTL parameter may be reconciled with the TTL range provided by guidelines 206. If the changed TTL parameter is determined to be outside of the range provided by guidelines 206, then a number of operations may occur in various embodiments, as discussed in more detail in relation to FIG. 3. A TTL parameter is used herein as just one example of a possible operational context of various embodiments. Another such exemplar may be guidelines being used in the context of a registry, where a change is detected in a setting of the registry, and reconciliation of the change with guidelines for the registry is facilitated. Many such operational contexts are possible, such as facilitating conformance of a security parameter on detection of a change with the security parameter, as would be readily apparent to one skilled in the art.

In various embodiments, the subset of the element where the change was detected may be reconciled with the relevant conformance authority guideline(s). In various other embodiments, the operational context may involve less granularity, and facilitating reconciling the change with a conformance authority may comprise facilitating the conformance authority in asserting all of its guidelines for the changed element against the element to determine if the element is in conformance. Guidelines 206 may comprise guidelines in a wide range of formats, including but not limited to, one or more searches of expressions. In some such embodiments, guidelines 206 may serve to ensure a certain expression either does or does not exist within the element at issue. In some other such embodiments, guidelines 206 may encompass accompanying specified values, or ranges of values, for the expressions. In various other embodiments, guidelines 206 may involve other operations, structure, and the like, to provide a basis for the conformance authority to determine conformance.

Figure 3:
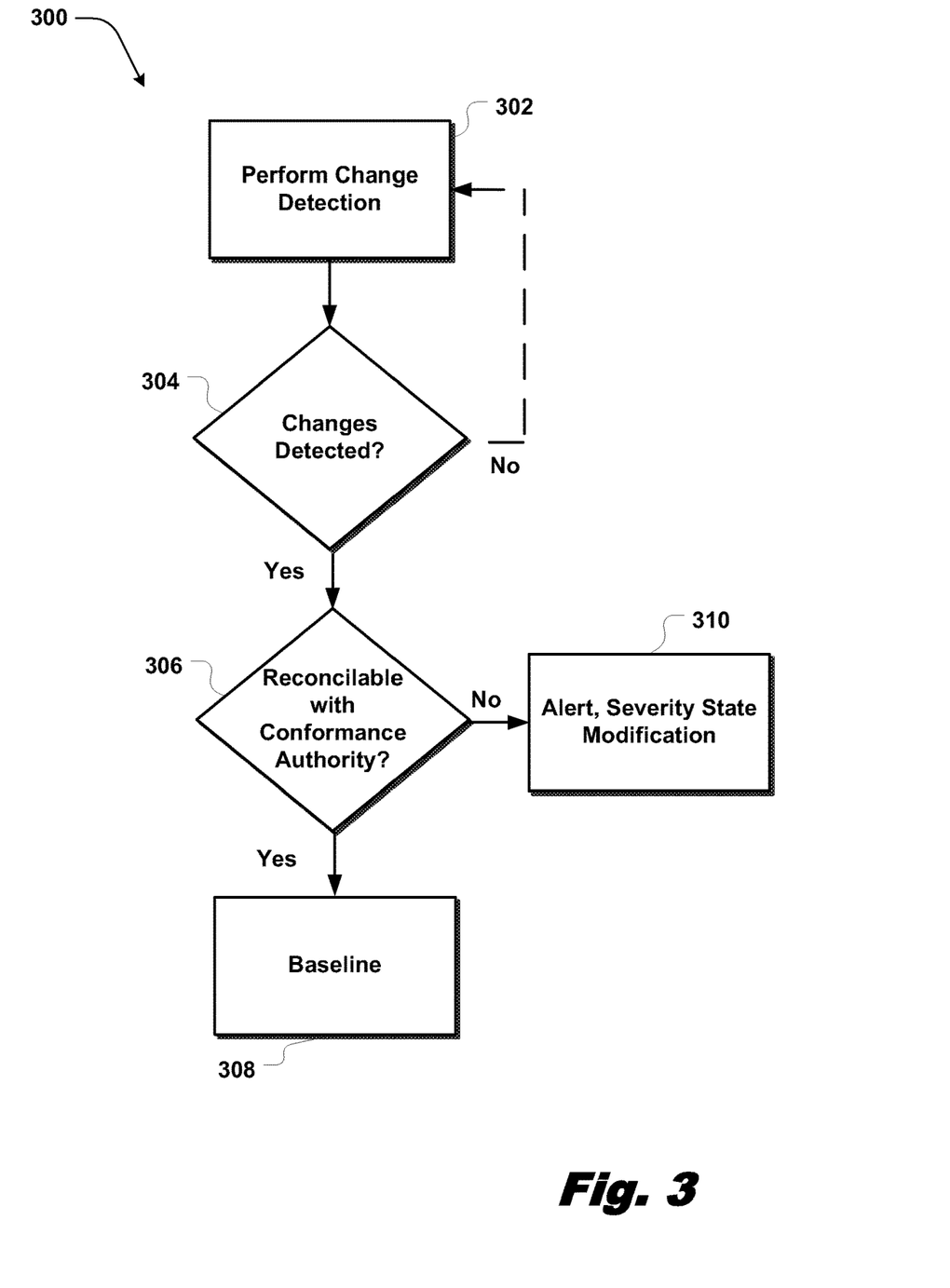
FIG. 3 illustrates parts of a conformance authority reconciliation workflow, in accordance with various embodiments of this invention.

FIG. 3 illustrates parts of a conformance authority reconciliation workflow 300, in accordance with various embodiments of this invention. While certain operations are illustrated in FIG. 3, other operations may supplement or supplant the operations shown, in the context of various embodiments. Conformance authority reconciliation workflow 300 may include various operations, including operation, Perform Change Detection 302, where a change detection agent may perform one or more change detection operations to a data processing device. Perform Change Detection 302 may be followed by an operation determining whether changes were detected as a result of performing the one or more change detection operations, denoted as Changes Detected? 304. In various embodiments, some change detection agents that perform operation, Changes Detected? 304, may additionally or alternatively include other operations.

If operation 304 is determined in the affirmative, then operation, Reconcilable with Conformance Authority? 306, may follow in some embodiments. If operation 304 is determined in the negative, then operation, Perform Change Detection 302, may follow in some embodiments, either immediately, after a delay, at a future scheduled time, etc. In various other embodiments, operation 304 being determined in the negative may be followed by another operation (not shown) or may comprise an endpoint, either temporary or otherwise.

If Reconcilable with Conformance Authority? 306 is determined in the affirmative, then operation, Baseline 308, may follow in various embodiments. In various embodiments, Baseline 308 may include changing a baseline of an element of a data processing device to incorporate the change or changes detected in operation 304. In various embodiments, Baseline 308 may include additional or alternative sub-operations. In various embodiments, a baseline of an element may include a full version of the element. In various embodiments, a baseline of an element may include a text version of the element. In one such embodiment in the case where the element is a file, the baseline of the file may include a text version of the file. In various other embodiments, a baseline of an element may additionally or alternatively include other things, including but not limited to, attributes of the element.

In various embodiments, one or more additional operations other than Baseline 308 may follow an affirmative determination of Reconcilable with Conformance Authority? 306. In various embodiments, operation 306 being determined in the affirmative may be followed by modifying a severity state of the detected change (not shown), such as decreasing it. In various embodiments, operation 306 being determined in the affirmative may be followed by automatic approval of the detected change(s) without modification to the baseline state. In some other embodiments, no response may follow an affirmative determination of Reconcilable with Conformance Authority? 306.

If Reconcilable with Conformance Authority? 306 is determined in the negative, then operation, Alert 310, may follow in various embodiments. In various embodiments, Alert 310 may include alerting the nonconformance of a detected change. Alerting the nonconformance of a detected change may take many forms, according to various embodiments, including but not limited to, creating a helpdesk incident, alerting with a severity state indicator of the change in a graphical user interface (GUI), notifying a user (for example, a system administrator) of the nonconforming change, reverting the element, or a portion of the element, back to its baseline state, etc. In various embodiments, operation 306 being determined in the negative may be followed by modifying a severity state of the change detected, such as increasing it. In various embodiments, Alert 310 may include facilitating a user to modify the element at issue to conform to at least one of the one or more guidelines of a conformance authority. In some embodiments, such facilitation may include reporting the one or more guidelines that were violated by the detected change. In various embodiments, such facilitation may include other sub-operations.

In various other embodiments, operation 306 being determined in the negative may be followed by various other operations. The sophistication of operation 306 may vary widely, depending on the implementation and the information available to make the reconciliation. In various embodiments, a further operation of determining one or more users associated with the detected change may be included. In various embodiments, Alert 310 may include the one or more users associated with the detected change. In some embodiments, the one or more users associated with the detected change may be the user(s) determined to have caused the change.

In various embodiments, conformance authority reconciliation may be performed to maintain or demonstrate control of an enterprise's information technology infrastructure. In various embodiments, conformance authority reconciliation may be performed to maintain or demonstrate control of an enterprise's financial systems or data. In various embodiments, conformance authority reconciliation may be performed to maintain or demonstrate control of an enterprise's business processes, such as, for example, enterprise resource planning (ERP) or customer relationship management (CRM). In various embodiments, conformance authority reconciliation may be performed to facilitate compliance with governmental laws/regulations regarding establishment and maintenance of an internal control structure and/or procedures for financial reporting, such as, for example, the Sarbanes-Oxley Act (the Public Company Accounting Reform and Investor Protection Act), including any amendments and/or successor Acts to any part of the Sarbanes-Oxley Act, or the like.

In various embodiments, conformance authority reconciliation may be performed to facilitate compliance with a number of laws, regulations, or guidelines, including but not limited to, the Gramm Leach Bliley Act, the regulations of Food and Drug Administration 21 Code of Federal Regulations 11, the Health Insurance Portability & Accountability Act, the Visa Cardholder Information Security Plan, the Payment Card Industry (PCI) Data Security Standard, the National Credit Union Administration Guidelines, the Office of the Comptroller of the Currency Guidelines, the International Organization for Standardization 17799, Common Criteria Certification, California Civil Code Senate Bill 1386 (California Security Breach Information Act), or the like, including any amendments and/or successors to any of the above, or the like.

In various embodiments, conformance authority reconciliation may be performed as part of an audit of an enterprise, including but not limited to, a financial accounting or statement audit. In some such embodiments, conformance authority reconciliation may be performed to at least provide an audit trail for said audit.

In various embodiments where conformance authority reconciliation is performed to maintain or demonstrate control of an enterprise's information technology infrastructure, financial systems or data, or business processes, use of conformance authority reconciliation may occur in a number of areas, including but not limited to, access control, network security, auditing and monitoring of security-related events, or the like. In various embodiments where conformance authority reconciliation is performed to maintain or demonstrate control of an enterprise's information technology infrastructure, financial systems or data, or business processes, said maintenance or demonstration of control may include other aspects of an enterprise's information technology infrastructure, financial systems or data, or business processes, respectively.

In various embodiments where conformance authority reconciliation is performed as part of an audit of an enterprise, or to facilitate compliance with governmental laws/regulations, use of conformance authority reconciliation may occur in a number of areas, including but not limited to, access control, network security, auditing and monitoring of security-related events, or the like. In various other embodiments, where conformance authority reconciliation is performed as part of an audit of an enterprise, or to facilitate compliance with governmental laws/regulations, use of conformance authority reconciliation may include other aspects of an enterprise audit or regulatory compliance procedures, respectively.

Figure 4:
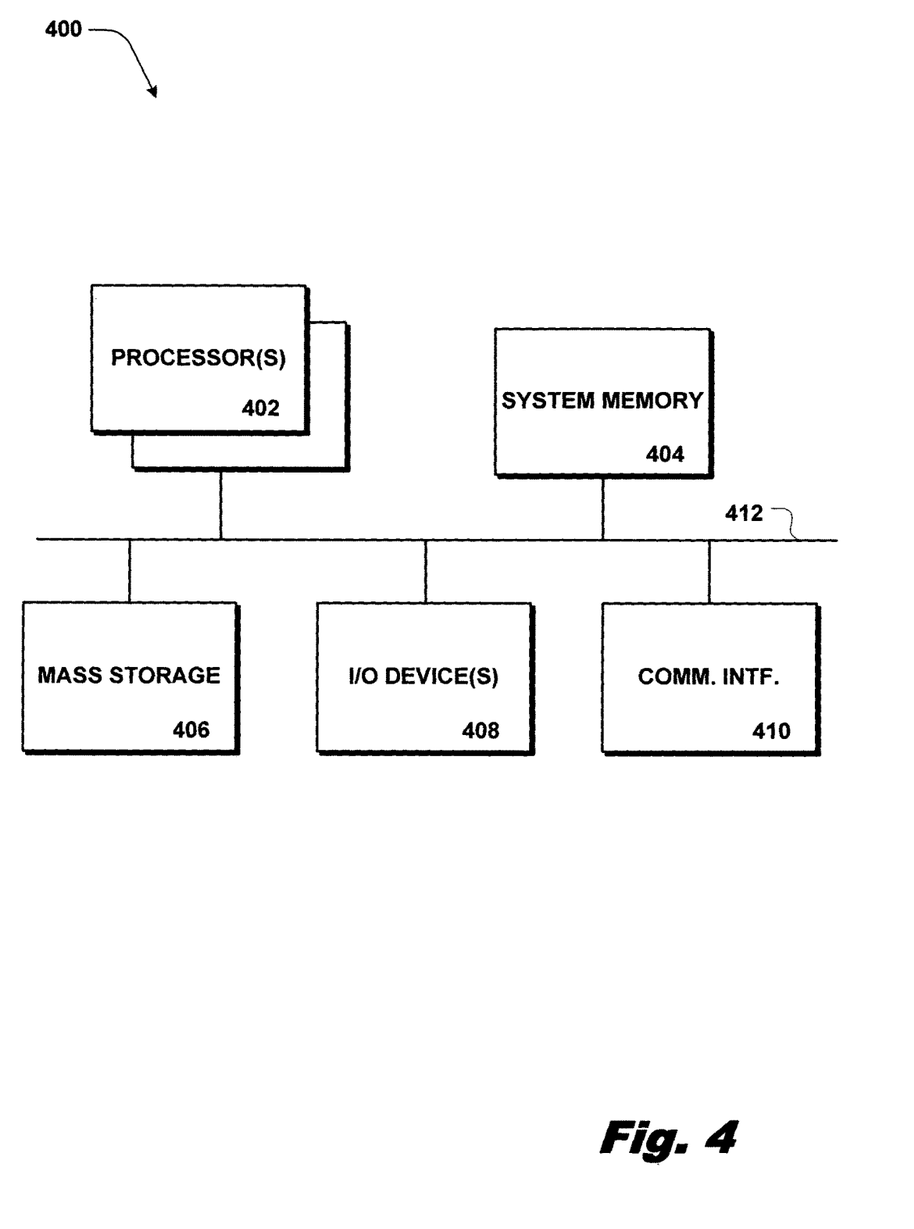
FIG. 4 illustrates an example computer system suitable for use in association with conformance authority reconciliation, in accordance with various embodiments of this invention.

FIG. 4 illustrates an example computer system suitable for use in association with out-of-band change detection, in accordance with various embodiments of this invention. As shown, computer system 400 may include one or more processors 402 and may include system memory 404. Additionally, computer system 400 may include mass storage 406 in the form of one or more devices (such as diskette, hard drive, compact disk (CD), flash memory, and so forth), input/output devices 408 (such as keyboard, cursor control and so forth) and communication interfaces 410 (such as network interface cards, modems and so forth). The elements may be coupled to each other via system bus 412, which may represent one or more buses. In the case where system bus 412 represents multiple buses, the multiple buses may be bridged by one or more bus bridges (not shown).

These elements each perform their conventional functions known in the art. In various embodiments, communication interfaces 410 may facilitate coupling of computing system 400 to a network, though which computing system 400 may be coupled to data processing device 102 of FIG. I and so forth, as necessary. In various embodiments, computing system 400 may at least be partially incorporated in a data processing device, such as data processing device 102 of FIG. 1. System memory 404 and mass storage 406 may be employed to store a working copy and a permanent copy of the programming instructions implementing various aspects of the one or more earlier described embodiments of the present invention. In various embodiments, the programming instructions may at least partially implement a change control subsystem adapted to identify a change to an element of a data processing device of a data processing environment. In various embodiments, the change control subsystem may additionally or alternatively include other functionality. In various embodiments, the programming instructions may at least partially implement an audit subsystem coupled to the change control subsystem to provide an audit trail of reconciling the change with a conformance authority, the conformance authority having one or more guidelines. In various embodiments, the audit subsystem may additionally or alternatively include other functionality.

The permanent copy of the programming instructions may be loaded into mass storage 406 in the factory or in the field, through a distribution medium (not shown), or through communication interface 410 from, for example, a distribution server (not shown). The constitution of these elements 402-412 are known, and accordingly will not be further described. In alternate embodiments, part or all of the one or more modules may be implemented in hardware, for example, using one or more Application Specific Integrated Circuits (ASICs) instead.

Thus, it can be seen from the above description, an automated method for facilitating management of a data processing environment is described. In various embodiments, the method may include facilitating detecting of a change to an element of a data processing device of the data processing environment. In various embodiments, the method may further include facilitating reconciling the change with a conformance authority, the conformance authority having one or more guidelines. Other embodiments of the present invention may include, but are not limited to, apparatuses adapted to facilitate practice of the above-described method. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. An automated, computer-implemented method for facilitating management of a data processing environment, the method comprising:

by a change detection agent, detecting a change to an element of a data processing device of the data processing environment by comparing a state of the data processing device to a baseline state of the data processing device;

separately from the detecting the change and also by the change detection agent, determining whether the detected change violates one or more guidelines of a conformance authority;

responsive to determining that the detected change violates at least one of the guidelines, performing one or more responses;

responsive to determining that the detected change does not violate the at least one of the guidelines, changing the baseline state to incorporate the change;

reporting the detected change together with a performance parameter of the data processing device; and changing the one or more guidelines used by the change detection agent based on the reported performance parameter.

2. The method of claim 1, further comprising, by the change detection agent, determining whether the one or more guidelines of the conformance authority relates to at least a subset of the element where the detected change was detected.

3. The method of claim 1, further comprising determining one or more users associated with the detected change.

4. The method of claim 1, wherein the data processing device is a device selected from the group consisting of a networking device, a server, a desktop computer, a laptop computer, a tablet computer, a personal digital assistant, a cellular phone, a set top box, and a media player.

5. The method of claim 1, wherein the method maintains or demonstrates control of one or more selected from the group consisting of an enterprise's information technology infrastructure, an enterprise's financial systems, an enterprise's financial data and an enterprise's business processes.

6. The method of claim 1, wherein the method is part of an audit of an enterprise and provides an audit trail for the audit.

7. The method of claim 1, wherein the one or more guidelines specify multiple conforming values for the element.

8. The method of claim 7, wherein the one or more guidelines specify a search for an expression that should not exist in the element.

9. The method of claim 1, wherein the one or more responses include modifying a severity state of the change detected.

10. The method of claim 1, wherein the conformance authority also has device start-up configuration guidelines, and wherein the method further comprises:
    detecting a start-up configuration change to a second element of the data processing device; and
    in response to detecting the start-up configuration change, determining if the start-up configuration change violates at least one of the device start-up configuration guidelines.

11. The method of claim 1, wherein the one or more responses comprises reverting the element of the data processing device to the baseline state.

12. The method of claim 1, wherein the one or more guidelines of the conformance authority are a subset of guidelines from the conformance authority specific for the data processing device.

13. The method of claim 1, wherein the conformance authority is a policy-based management tool separate from the change detection agent.

14. The method of claim 1, wherein the change detection agent is a dedicated change detection agent for the data processing device and performs the detecting, determining, performing, and changing only for the data processing device and not for any other data processing device in the data processing environment.

15. The method of claim 1, wherein the reported performance parameter represents a number of transactions per time period processed or network outages.

16. One or more non-transitory computer-readable storage media storing instructions that, when executed by a computer, cause the computer to perform a method, the method comprising:
    by a change detection agent, detecting a change to an element of a data processing device of a data processing environment by comparing a state of the data processing device to a baseline state of the data processing device;
    separately from the detecting the change and also by the change detection agent, determining whether the detected change violates one or more guidelines of a conformance authority;
    responsive to determining that the detected change violates at least one of the guidelines, performing one or more responses;
    responsive to determining that the detected change does not violate the at least one of the guidelines,
    changing the baseline state to incorporate the detected change;
    reporting the detected change together with a performance parameter of the data processing device; and
    changing the one or more guidelines used by the change detection agent based on the reported performance parameter.

17. The media of claim 16, wherein the one or more responses include an alert response.

18. The media of claim 16, wherein the method maintains or demonstrates control of one or more selected from the group consisting of an enterprise's information technology infrastructure, an enterprise's financial systems, an enterprise's financial data and an enterprise's business processes.

19. The media of claim 16, wherein the one or more guidelines specify multiple conforming values for the element.

20. The media of claim 19, wherein the one or more guidelines specify a search for an expression that should not exist in the element.

21. The media of claim 19, wherein the change detection agent is a dedicated change detection agent for the data processing device and performs the detecting, determining, performing, and changing only for the data processing device and not for any other data processing device in the data processing environment.

22. The media of claim 19, wherein the reported performance parameter represents a number of transactions per time period processed or network outages.

23. The media of claim 16, wherein the one or more responses include modifying a severity state of the change detected.

24. The media of claim16, wherein the one or more guidelines include a device start-up configuration guideline that specifies a time-to-live (TTL) parameter.

25. The media of claim 16, wherein the one or more responses comprises reverting the element of the data processing device to the baseline state.

26. The media of claim 16, wherein the one or more guidelines of the conformance authority are a subset of guidelines from the conformance authority specific for the data processing device.

27. The media of claim 16, wherein the conformance authority is a policy-based management tool separate from the change detection agent.

\* \* \* \* \*